J. A. KAVANAGH.
FOOD PACKAGE.
APPLICATION FILED DEC. 14, 1911.

1,042,119.

Patented Oct. 22, 1912.

Witnesses:
Marion J. Balfour
Florence Cunningham

J. A. Kavanagh, Inventor
By his Attorney

UNITED STATES PATENT OFFICE.

JAMES A. KAVANAGH, OF NEW YORK, N. Y.

FOOD-PACKAGE.

1,042,119.      Specification of Letters Patent.      Patented Oct. 22, 1912.

Application filed December 14, 1911. Serial No. 665,608.

*To all whom it may concern:*

Be it known that I, JAMES A. KAVANAGH, of the city of New York, in the county of New York and State of New York, have invented certain new and useful Improvements in Food-Packages; and I do hereby declare the following to be a full, clear, and exact description of the invention, such as will enable others skilled in the art to which it appertains to make and use the same.

My invention contemplates an improved food package.

It relates to the packing of cheese and its object is to provide improved means for facilitating the retail sale of this commodity.

As is well known, cheese ferments or "works," due to the acids created by the decomposing action of the bacteria. Hence it is necessary to provide cheese receptacles with vents through which the gases may escape. For this reason it has not been deemed practicable to provide small salable packages of cheese adapted for individual retail sale.

By my invention the units of cheese are preferably cubes of about one inch in size. I employ waxed paper in which are perforations.

Figure 1:
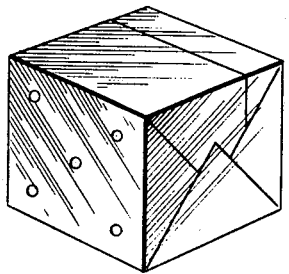
Figure 2:
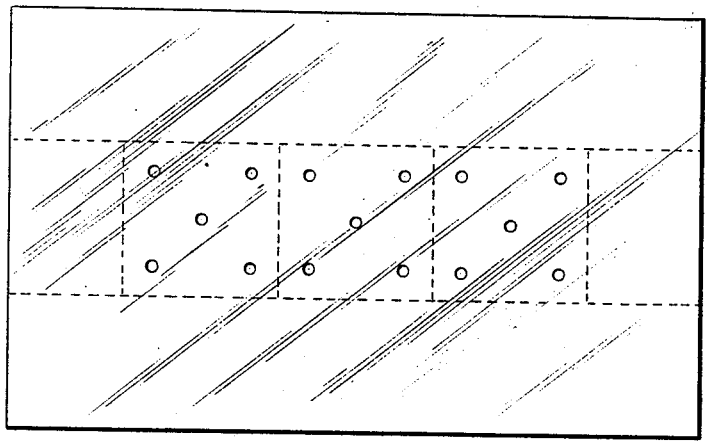

In the drawing I have shown in Figure 1 a sheet of waxed wrapping paper appropriately perforated, while Fig. 2 shows the completed package.

The wrapping paper is transparent and is of color corresponding to that of the cheese, so that the purchaser may see at a glance whether the package contains American, Swiss, Roquefort or Camembert cheese.

By the means described cheese may be packed and distributed to retail selling points and purchased in desired quantities without unnecessary handling, and it may be kept in the packages for a relatively long period of time. The cleanliness of the commodity is maintained and its taste is not affected by contact with other matter.

I claim as my invention:—

As an article of manufacture, a food package consisting of a small section of cheese adapted for retail distribution, and a paper wrapper perforated at suitable points to provide vents for the escape of the gases created by the fermentation of the cheese.

In testimony whereof, I have signed this specification in the presence of two subscribing witnesses.

JAMES A. KAVANAGH.

Witnesses:
 WILLIAM J. HARDIMAN,
 NATHANIEL G. PENDLETON.